US011477905B2

(12) United States Patent
Harvey et al.

(10) Patent No.: US 11,477,905 B2
(45) Date of Patent: Oct. 18, 2022

(54) DIGITAL LABELING CONTROL SYSTEM TERMINALS THAT ENABLE GUIDED WIRING

(71) Applicants: Troy Aaron Harvey, Brighton, UT (US); Jeremy David Fillingim, Salt Lake City, UT (US)

(72) Inventors: Troy Aaron Harvey, Brighton, UT (US); Jeremy David Fillingim, Salt Lake City, UT (US)

(73) Assignee: PassiveLogic, Inc., Salt Lake City, UT (US)

( * ) Notice: Subject to any disclaimer, the term of this patent is extended or adjusted under 35 U.S.C. 154(b) by 0 days.

(21) Appl. No.: 17/135,591

(22) Filed: Dec. 28, 2020

(65) Prior Publication Data

US 2022/0067261 A1 Mar. 3, 2022

Related U.S. Application Data

(60) Provisional application No. 63/070,460, filed on Aug. 26, 2020.

(51) Int. Cl.
*G06F 3/04847* (2022.01)
*H05K 7/14* (2006.01)
(Continued)

(52) U.S. Cl.
CPC ............ *H05K 7/1465* (2013.01); *F24F 11/32* (2018.01); *F24F 11/49* (2018.01); *F24F 11/63* (2018.01);
(Continued)

(58) Field of Classification Search
CPC .. G06F 30/392; G06F 3/0482; G06F 2115/12; H04L 67/125; H04L 67/36
See application file for complete search history.

(56) References Cited

U.S. PATENT DOCUMENTS

| 4,353,653 A | 10/1982 | Zimmerman |
| 5,208,765 A | 5/1993 | Turnbull |

(Continued)

FOREIGN PATENT DOCUMENTS

| CN | 103926912 B | 5/2014 |
| CN | 206002869 U | 8/2016 |

(Continued)

OTHER PUBLICATIONS

De Meester et al., SERIF:A Semantic ExeRcise Interchange FormatConference: Proceedings of the 1st International Workshop on LINKed EDucation, Oct. 2015.
(Continued)

*Primary Examiner* — Jennifer N Welch
*Assistant Examiner* — Kc Chen
(74) *Attorney, Agent, or Firm* — Genie Lyons

(57) ABSTRACT

Tools and techniques are described to create a controller wiring board. A user, using a user interface associated with a controller, can determine which devices will be attached to a controller. The features of the devices may be already known by the controller. The controller can change wiring terminal types depending on the requirements of the devices wired to the controllers. In some embodiments, a device is wired to a module associated with the controller. The controller can signal to the module to modify its wiring terminal to match the needs of the device to be wired to that location.

20 Claims, 17 Drawing Sheets

(51) Int. Cl.
*G06F 8/51* (2018.01)
*G06F 3/041* (2006.01)
*G05B 19/048* (2006.01)
*H04M 3/30* (2006.01)
*G05B 15/02* (2006.01)
*G06F 3/147* (2006.01)
*G05B 23/02* (2006.01)
*H02J 3/00* (2006.01)
*F24F 11/63* (2018.01)
*H04W 4/80* (2018.01)
*G06F 30/13* (2020.01)
*G06F 30/12* (2020.01)
*G06F 3/0482* (2013.01)
*H04L 67/125* (2022.01)
*G06F 30/18* (2020.01)
*G06F 8/41* (2018.01)
*G06F 8/53* (2018.01)
*G06F 8/74* (2018.01)
*F24F 11/32* (2018.01)
*F24F 11/88* (2018.01)
*F24F 11/49* (2018.01)
*G05B 13/02* (2006.01)
*H04L 67/12* (2022.01)
*G06F 1/3209* (2019.01)
*G06F 1/3246* (2019.01)
*G06F 9/4401* (2018.01)
*H04W 84/00* (2009.01)
*G06Q 30/02* (2012.01)
*H04B 3/46* (2015.01)
*H04L 43/50* (2022.01)
*H04L 67/75* (2022.01)
*G06F 30/392* (2020.01)
*G06F 113/04* (2020.01)
*G06F 115/12* (2020.01)
*G06F 111/04* (2020.01)
*G06F 111/16* (2020.01)
*G06F 113/16* (2020.01)

(52) U.S. Cl.
CPC .......... *F24F 11/88* (2018.01); *G05B 13/0265* (2013.01); *G05B 15/02* (2013.01); *G05B 19/048* (2013.01); *G05B 23/0216* (2013.01); *G05B 23/0264* (2013.01); *G05B 23/0272* (2013.01); *G06F 1/3209* (2013.01); *G06F 1/3246* (2013.01); *G06F 3/0482* (2013.01); *G06F 3/04186* (2019.05); *G06F 3/04847* (2013.01); *G06F 3/147* (2013.01); *G06F 8/436* (2013.01); *G06F 8/51* (2013.01); *G06F 8/53* (2013.01); *G06F 8/74* (2013.01); *G06F 9/4418* (2013.01); *G06F 30/12* (2020.01); *G06F 30/13* (2020.01); *G06F 30/18* (2020.01); *G06Q 30/0283* (2013.01); *H02J 3/00* (2013.01); *H04B 3/46* (2013.01); *H04L 43/50* (2013.01); *H04L 67/12* (2013.01); *H04L 67/125* (2013.01); *H04L 67/75* (2022.05); *H04M 3/305* (2013.01); *H04W 4/80* (2018.02); *H04W 84/00* (2013.01); *H05K 7/1468* (2013.01); *H05K 7/1477* (2013.01); *H05K 7/1481* (2013.01); *G06F 30/392* (2020.01); *G06F 2111/04* (2020.01); *G06F 2111/16* (2020.01); *G06F 2113/04* (2020.01); *G06F 2113/16* (2020.01); *G06F 2115/12* (2020.01); *H02J 2310/12* (2020.01)

(56) References Cited

U.S. PATENT DOCUMENTS

| | | | |
|---|---|---|---|
| 5,530,643 A * | 6/1996 | Hodorowski | G05B 19/0421 700/83 |
| 6,275,962 B1 * | 8/2001 | Fuller | G01R 31/31905 714/724 |
| 6,301,341 B1 | 10/2001 | Gizara et al. | |
| 6,606,731 B1 | 8/2003 | Baum et al. | |
| 6,813,777 B1 | 11/2004 | Weinberger et al. | |
| 7,304,855 B1 | 12/2007 | Milligan et al. | |
| 7,578,135 B2 | 8/2009 | Mattheis | |
| 7,587,250 B2 | 9/2009 | Coogan et al. | |
| 7,702,421 B2 | 4/2010 | Sullivan et al. | |
| 7,729,882 B2 | 6/2010 | Seem | |
| 7,734,572 B2 | 6/2010 | Wiemeyer et al. | |
| 7,835,431 B2 | 11/2010 | Belge | |
| 7,917,232 B2 | 3/2011 | McCoy et al. | |
| 8,024,054 B2 | 9/2011 | Mairs et al. | |
| 8,099,178 B2 | 1/2012 | Mairs et al. | |
| 8,503,943 B2 | 8/2013 | Spanhake | |
| 8,628,239 B2 | 1/2014 | Merrow et al. | |
| 8,643,476 B2 * | 2/2014 | Pinn | H04Q 1/136 340/10.6 |
| 8,749,959 B2 | 6/2014 | Riley et al. | |
| 8,782,619 B2 | 7/2014 | Wu et al. | |
| 8,925,358 B2 | 1/2015 | Kasper | |
| 9,441,847 B2 | 9/2016 | Grohman | |
| 9,521,724 B1 | 12/2016 | Berry et al. | |
| 9,544,209 B2 | 1/2017 | Gielarowski et al. | |
| 9,602,301 B2 | 3/2017 | Averitt | |
| 9,678,494 B2 | 6/2017 | Hyde et al. | |
| 9,740,385 B2 | 8/2017 | Fadell et al. | |
| 9,791,872 B2 | 10/2017 | Wang et al. | |
| 9,857,238 B2 | 1/2018 | Malhotra et al. | |
| 9,860,961 B2 | 1/2018 | Chemel et al. | |
| 9,952,573 B2 | 4/2018 | Sloo et al. | |
| 10,042,730 B2 | 8/2018 | Zebian | |
| 10,094,586 B2 | 10/2018 | Pavlovski et al. | |
| 10,223,721 B1 | 3/2019 | Bhatia | |
| 10,528,016 B2 | 1/2020 | Noboa | |
| 10,557,889 B2 | 2/2020 | Montoya et al. | |
| 10,558,183 B2 | 2/2020 | Piaskowski et al. | |
| 10,558,248 B2 | 2/2020 | Adrian | |
| 10,627,124 B2 | 4/2020 | Walser et al. | |
| 10,640,211 B2 | 5/2020 | Whitten et al. | |
| 10,672,293 B2 | 6/2020 | Labutov et al. | |
| 10,687,435 B2 | 6/2020 | Adrian et al. | |
| 10,736,228 B2 | 8/2020 | Kho et al. | |
| 10,892,946 B2 | 1/2021 | Correia e Costa et al. | |
| 10,900,489 B2 | 1/2021 | Rendusara et al. | |
| 10,942,871 B2 | 3/2021 | Cawse et al. | |
| 10,943,444 B2 | 3/2021 | Boyd et al. | |
| 10,966,068 B2 | 3/2021 | Tramiel et al. | |
| 10,966,342 B2 | 3/2021 | Lairsey et al. | |
| 11,088,989 B2 | 8/2021 | Gao et al. | |
| 2004/0236547 A1 | 11/2004 | Rappaport et al. | |
| 2007/0096902 A1 | 5/2007 | Seeley et al. | |
| 2007/0162288 A1 | 7/2007 | Springhart et al. | |
| 2008/0222584 A1 | 9/2008 | Habib et al. | |
| 2008/0270951 A1 | 10/2008 | Anand et al. | |
| 2008/0277486 A1 | 11/2008 | Seem et al. | |
| 2010/0005218 A1 | 1/2010 | Gower et al. | |
| 2010/0025483 A1 | 2/2010 | Hoeynck et al. | |
| 2010/0131933 A1 | 5/2010 | Kim et al. | |
| 2010/0162037 A1 | 6/2010 | Maule et al. | |
| 2010/0237891 A1 | 9/2010 | Lin et al. | |
| 2011/0087988 A1 | 4/2011 | Ray et al. | |
| 2011/0125930 A1 * | 5/2011 | Tantos | G06F 13/4068 710/8 |
| 2012/0084231 A1 | 4/2012 | McNaught et al. | |
| 2012/0102472 A1 | 4/2012 | Wu et al. | |
| 2012/0221986 A1 | 8/2012 | Whitford et al. | |
| 2013/0343207 A1 | 12/2013 | Cook et al. | |
| 2013/0343388 A1 | 12/2013 | Stroud et al. | |
| 2013/0343389 A1 | 12/2013 | Stroud et al. | |
| 2013/0343390 A1 | 12/2013 | Moriarty et al. | |
| 2013/0346987 A1 | 12/2013 | Raney et al. | |

(56) References Cited

U.S. PATENT DOCUMENTS

| | | |
|---|---|---|
| 2014/0088772 A1 | 3/2014 | Lelkens |
| 2014/0101082 A1 | 4/2014 | Matsuoka et al. |
| 2014/0215446 A1 | 7/2014 | Araya et al. |
| 2014/0277757 A1 | 9/2014 | Wang et al. |
| 2014/0364985 A1 | 12/2014 | Tiwari et al. |
| 2015/0059522 A1 | 3/2015 | Hughes |
| 2015/0081928 A1* | 3/2015 | Wintzell ............... G06F 13/409 710/8 |
| 2015/0198938 A1 | 7/2015 | Steele et al. |
| 2015/0199088 A1 | 7/2015 | Chandaria et al. |
| 2015/0234381 A1 | 8/2015 | Ratilla et al. |
| 2016/0062753 A1 | 3/2016 | Champagne |
| 2016/0073521 A1 | 3/2016 | Marcade et al. |
| 2016/0086242 A1 | 3/2016 | Schafer et al. |
| 2016/0088438 A1 | 3/2016 | O'Keeffe |
| 2016/0092427 A1 | 3/2016 | Bittmann |
| 2016/0132308 A1 | 5/2016 | Muldoon |
| 2016/0195856 A1 | 7/2016 | Spero |
| 2016/0205784 A1 | 7/2016 | Kyle et al. |
| 2016/0209868 A1 | 7/2016 | Hartman et al. |
| 2016/0285715 A1 | 9/2016 | Gielarowski et al. |
| 2016/0295663 A1 | 10/2016 | Hyde et al. |
| 2017/0097259 A1 | 4/2017 | Brown et al. |
| 2017/0131611 A1 | 5/2017 | Brown et al. |
| 2017/0149638 A1 | 5/2017 | Gielarowski et al. |
| 2017/0169075 A1 | 6/2017 | Jiang et al. |
| 2017/0176034 A1 | 6/2017 | Hussain et al. |
| 2017/0322579 A1 | 11/2017 | Goparaju et al. |
| 2017/0365908 A1 | 12/2017 | Hughes et al. |
| 2018/0005195 A1 | 1/2018 | Jacobson |
| 2018/0075168 A1 | 3/2018 | Tiwari et al. |
| 2018/0089172 A1 | 3/2018 | Needham |
| 2018/0123272 A1 | 5/2018 | Mundt et al. |
| 2018/0202678 A1 | 7/2018 | Ahuja et al. |
| 2018/0266716 A1 | 9/2018 | Bender et al. |
| 2018/0307781 A1 | 10/2018 | Byers et al. |
| 2019/0087076 A1 | 3/2019 | Dey et al. |
| 2019/0138704 A1 | 5/2019 | Shrivastava et al. |
| 2019/0156443 A1 | 5/2019 | Idle |
| 2019/0173109 A1 | 6/2019 | Wang |
| 2019/0278442 A1 | 9/2019 | Liang |
| 2019/0294018 A1 | 9/2019 | Shrivastava et al. |
| 2020/0003444 A1 | 1/2020 | Yuan et al. |
| 2020/0018506 A1 | 1/2020 | Ruiz et al. |
| 2020/0050161 A1 | 2/2020 | Noboa |
| 2020/0133257 A1 | 4/2020 | Cella et al. |
| 2020/0167442 A1 | 5/2020 | Roecker et al. |
| 2020/0187147 A1 | 6/2020 | Meerbeek et al. |
| 2020/0221269 A1 | 7/2020 | Tramiel et al. |
| 2020/0226223 A1* | 7/2020 | Reichl ..................... G06F 30/12 |
| 2020/0228759 A1 | 7/2020 | Ryan et al. |
| 2020/0255142 A1 | 8/2020 | Whitten et al. |
| 2020/0279482 A1 | 9/2020 | Berry et al. |
| 2020/0342526 A1 | 10/2020 | Ablanczy |
| 2020/0379730 A1 | 12/2020 | Graham et al. |
| 2020/0387041 A1 | 12/2020 | Shrivastava et al. |
| 2020/0387129 A1* | 12/2020 | Chandaria ............ G05B 19/054 |
| 2021/0073441 A1 | 3/2021 | Austern et al. |
| 2021/0081504 A1 | 3/2021 | Mccormick et al. |
| 2021/0081880 A1 | 3/2021 | Bivins et al. |
| 2021/0157312 A1 | 5/2021 | Cella et al. |
| 2021/0182660 A1 | 6/2021 | Amirguliyev et al. |
| 2021/0366793 A1 | 11/2021 | Hung et al. |
| 2022/0070293 A1 | 3/2022 | Harvey et al. |

FOREIGN PATENT DOCUMENTS

| | | |
|---|---|---|
| CN | 206489622 U | 9/2017 |
| CN | 206489622 U | 9/2017 |
| JP | 6301341 B2 | 3/2018 |
| WO | 2008016500 A3 | 3/2008 |
| WO | 2012019328 A1 | 2/2012 |

OTHER PUBLICATIONS

Kalagnanam et al., "A System For Automated Mapping of Bill-of_Materials Part Numbers", KDD '04: Proceedings of the tenth ACM SIGKDD international conference on Knowledge discovery and data mining, Aug. 2004, pp. 805-810.

Mouser Electronics News Release, Aug. 16, 2018.

Ouf et al., Effectiveness of using WiFi technologies to detect and predict building occupancy, Sust. Buildi. 2, 7 (2017).

RadioMaze, Inc., "WiFi signals enable motion recognition throughout the entire home," Dec. 4, 2017.

Sensorswarm, 2018.

Serale G., et al., Model Predictive Control (MPC) for Enhancing Building and HVAC System Energy Efficiency: Problem Formulation, Applications and Opportunities, Energies 2018, 11, 631; doi: 10.3390, Mar. 12, 2018.

Siano, P, "Demand response and smart grids—A survey", Renewable and Sustainable Energy Reviews 30 (2014) 461-478.

Wang et al., "A Practical Multi-Sensor Cooling Demand Estimation Approach Based on Visual Indoor and Outdoor Information Sensing," Sensors 2018, 18, 3591; doi:10.3390.

Yegulap, Serdar, "What is LLVM? The power behind Swift, Rust, Clang, and more," Infoworld, Mar. 11, 2020.

Amin, Massoud, "Toward self-healing energy infrastructure systems," IEEE Computer Applications in Power 14.1 (2002): pp. 20-28.

Gou, Wenqi, and Mengchu Zhou, "An emerging technology for improved building automation control," 2009, IEEE International Conference on Systems, Man and Cybernetics, IEEE, 2009, pp. 337-342.

Gungor et al., "Industrial Wireless Sensor Networks: Challenges, Design Principles, and Technical Approaches," IEEE Transactions on Industrial Electronics, vol. 56, No. 10, Oct. 2009.

Assad, et al., Back Propagation Neural Networks (BPNN) and Sigmoid Activation Function in Multi-Layer Networks, Academic Journal of Nawroz University 8(4):216, Nov. 2019.

* cited by examiner

DIGITAL LABELING CONTROL SYSTEM TERMINALS THAT ENABLE GUIDED WIRING

RELATED APPLICATION

The present application hereby incorporates by reference the entirety of, and claims priority to, U.S. Provisional Patent Application Ser. No. 63/070,460 filed 26 Aug. 2020.

FIELD

The present disclosure relates to a digital labeling control system that enables guided wiring. More specifically, to controllers using a swarm of self-healing nodes to control resources.

BACKGROUND

Controlling buildings is a huge problem because the amount of computing power is so big. To develop a building plan and a wiring diagram currently requires IT networking skills, programming skills, and engineering skills. Specifically, programming sequences need to be determined manually, manual equipment discovery and wire-up must be separately (and manually) done using BACNET, DIRECT, etc.

SUMMARY

This summary is provided to introduce a selection of concepts in a simplified form that are further described below in the Detailed Description section. This summary does not identify required or essential features of the claimed subject matter.

In general, one innovative embodiment comprises a method to create a wiring panel for a controller. The controller comprises, at least, a processor, memory, and wiring terminals. A plurality of point locations are presented on a display associated with the controller. The point locations represent wiring terminals that can be used to wire devices to the controller. A plurality of device types are listed on the controller, the device types representing devices able to be wired to the controller. The device types have a protocol and a device point type. The user can move a device type to a controller point location. The controller can modify its wiring terminal to match the type of wiring terminal that the device requires.

In some embodiments, the controller has modules that connect to the controller. The modules have wiring terminals that are able to connect a device wire to the controller through a module connection. Some modules may have a module circuit board, which can accept a signal from the controller, the signal telling the module to modify a terminal such that it matches the requirements for a device that is to be wired to that location.

In some embodiments, a user can use an interface associated with the controller to determine which devices go where on the controller.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

Additional features and advantages will become apparent from the following detailed description of illustrated embodiments, which proceeds with reference to accompanying drawings.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

Figure 1:
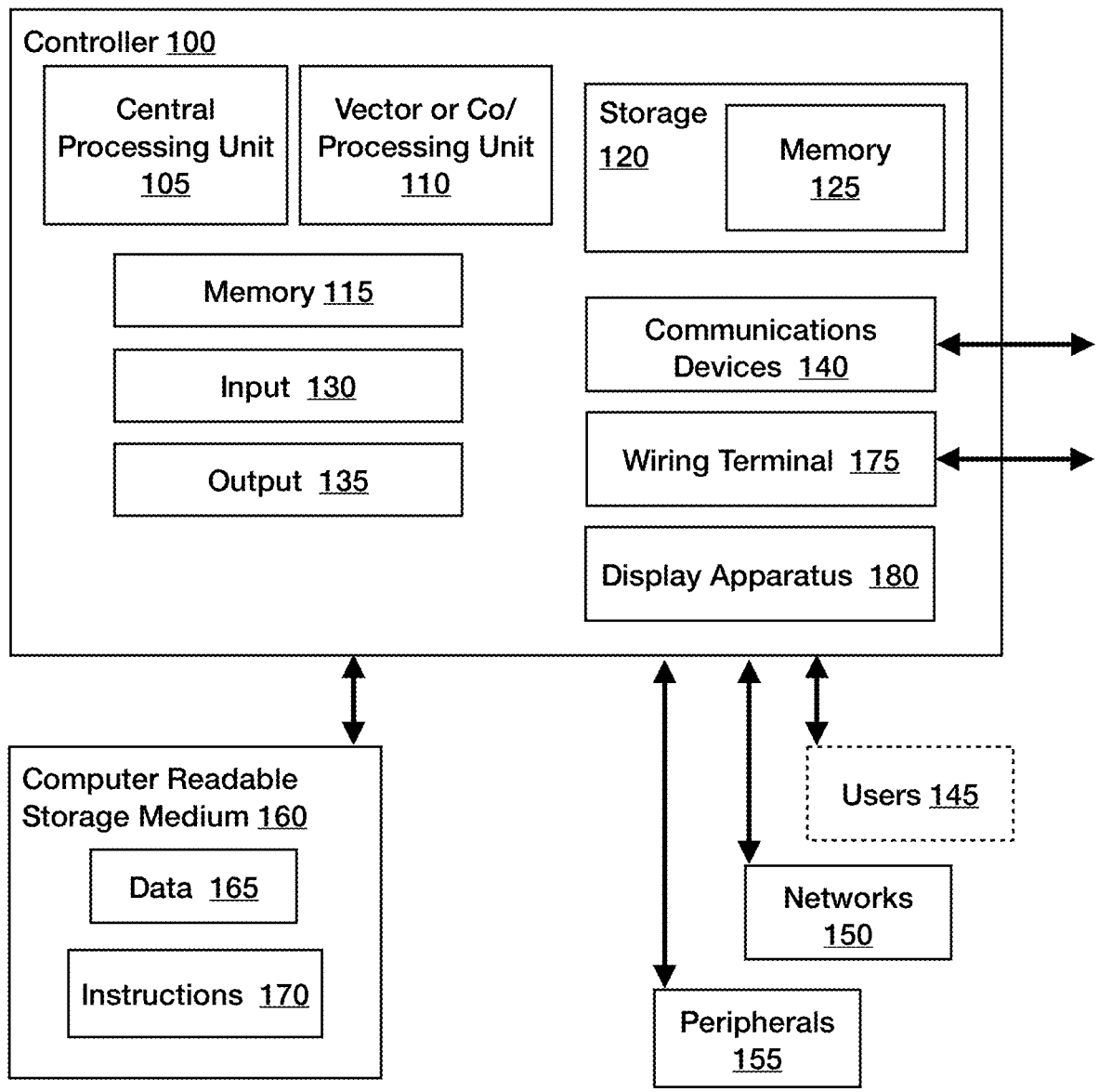
FIG. 1 is a functional block diagram showing an exemplary embodiment of a digital label control system in conjunction which described embodiments can be implemented.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to controllers using digital labeling to enable guided wiring. In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments. "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

In addition, it is appreciated that the figures provided herewith are for explanation purposes to persons ordinarily skilled in the art and that the drawings are not necessarily drawn to scale. To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). "Program" is used broadly herein, to include applications, kernels, drivers, interrupt handlers, firmware, state machines, libraries, and other code written by programmers (who are also referred to as developers) and/or automatically generated. "Optimize" means to improve, not necessarily to perfect. For example, it may be possible to make further improvements in a program or an algorithm which has been optimized.

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

Various alternatives to the implementations described herein are possible. For example, embodiments described with reference to flowchart diagrams can be altered, such as, for example, by changing the ordering of stages shown in the flowcharts, or by repeating or omitting certain stages.

I. Overview

With reference to FIG. 1, aspects of the present disclosure pertain to digital labeling control system that enables guided wiring. This system may be used with any of the embodiments described herein. Specifically, controller 100 includes at least one central processing unit 105 and memory 115, 125. The processing unit executes computer-executable instructions and may be a real or a virtual processor. There might also be a vector or co/processing unit 110 that enables fast vector processing. In a multi-processing system, multiple processing units execute computer-executable instructions to increase processing power. The controller may further comprise multiple controllers in communication using wired or wireless connections. These controllers may use a distributed operating system to communicate and divide tasks.

The memory 115, 125 may be volatile memory (e.g., registers, cache, RAM), non-volatile memory (e.g., ROM, EEPROM, flash memory, etc.), or some combination of the two. For example, the memory can be volatile memory, e.g., static memory cells, as in FPGAs and some CPLDs; or non-volatile memory, e.g., FLASH memory, as in some CPLDs, or in any other appropriate type of memory cell. The memory stores software implementing described techniques and tools. The computer system may be distributed, with multiple processors and associated memory in different locations that communicate using wired or wireless network connections. These distributed computing nodes may run simultaneously run the same program using distributed computing techniques.

A controller computing environment may have additional features. For example, the computing environment may include storage 120 which may also include memory 125, one or more input devices 130, one or more output devices 135, and one or more other communication devices 140. These may include touch screens, keyboards, game controllers, touchpads, LED screens, voice-operated input systems, printers, phone connections, FAX machines, etc. An interconnection mechanism such as a bus, controller, or network interconnects the components of the computing environment.

Typically, operating system software stored in memory 115, 125 provides an operating environment for other software executing in the computing environment, and coordinates activities of the components of the computing environment. The controller computer system 100 can connect to other computer systems through network(s) 150, which may be wired, wireless, or both. Peripherals 155, such as external hard drives, modems, mice, keyboards, zip drives, scanners, 3-d printers, etc. The controller 100 also comprises a display apparatus 180. The display apparatus 180 can be any display that is capable of displaying information in pictorial form. It may be able to accept input from the controller or from another source and display that input on a screen. It may also be capable of accepting input from the screen and passing that information to the controller. Users 145 may interact with the controller 100 through networks 150, the display apparatus 180, communications devices 140, etc.

The computing system 100, like other suitable systems, also includes one or more computer-readable storage media 160. Media 160 may be of different physical types. The media 160 may be volatile memory, non-volatile memory, fixed in place media, removable media, magnetic media, optical media, solid-state media, and/or of other types of physical durable storage media (as opposed to merely a propagated signal). In particular, a configured medium 160 such as a portable (i.e., external) hard drive, CD, DVD, memory stick, or other removable non-volatile, non-transient memory medium may become functionally a technological part of the computer system when inserted or otherwise installed, making its content accessible for interaction with and use by central processing unit 105. The removable configured medium 960 is an example of a computer-readable storage medium 160. Some other examples of computer-readable storage media 160 include built-in RAM, ROM, hard disks, and other memory storage devices which are not readily removable by users 945. A computer-readable medium should not be considered a signal; neither should a computer-readable memory be considered a signal.

The medium 160 is configured with instructions 170 that are executable by a central processing unit 105; "executable" is used broadly to include, human readable source code, such as Java or C++, compiled code, and/or machine code. Executable code also includes code that a runs using a distributed system, such as a series of controllers and controllers that distribute and run complex problems. The medium 160 is also configured with data 165 which is created, modified, referenced, and/or otherwise used for technical effect by execution of the instructions 170. The instructions 170 and the data 165 configure the memory or other storage medium 160 in which they reside; when that memory or other computer readable storage medium is a functional part of a given computer system, the computer system may be configured by the instructions 170 and data 165.

The controller may compromise one or more wiring terminals 175. These wiring terminals 175 are used to wire a device to the controller 100. Such devices comprise HVAC equipment, lighting equipment, irrigation equipment, sensors, security equipment, and so forth. Some devices require multiple wiring terminals. Messages may then be sent from the controller to the device through the wiring terminal. Messages may also be sent from the device to the controller through the wiring terminal. In some embodiments a module attached to the controller. In these embodiments, the wiring terminals attach to the module. The wiring terminals attach to the controller through the module. The wiring terminal 175 may be directly attached to the controller 105, or may be part of a module that is itself attached to the controller, receives signals from the controller, and passes signals to the controller. One or more wiring terminals comprise a wiring panel, which may be comprised of modules.

Although an embodiment may be described as being implemented as software instructions executed by one or more processors in a computing device (e.g., general purpose computer, cell phone, or controller), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

II. Exemplary Method and Systems for Creating a Controller Wiring Board

Figure 2:
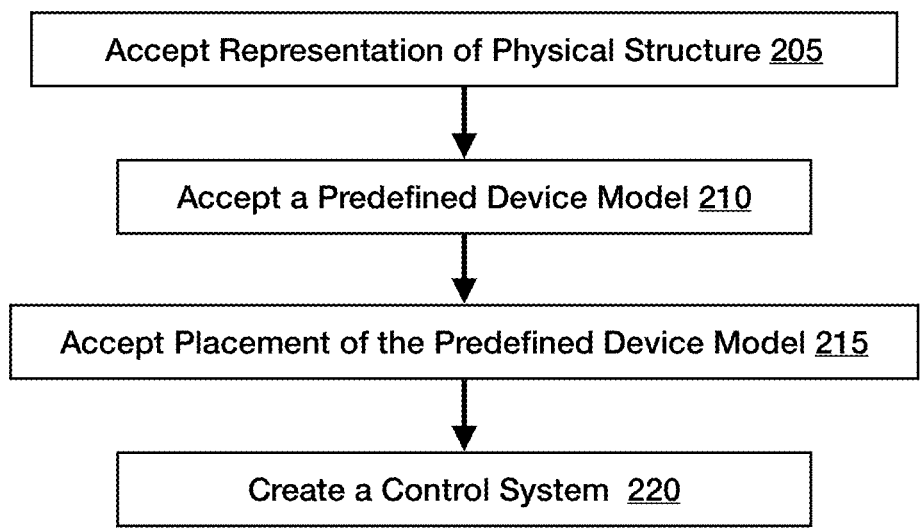
FIG. 2 is a flow chart showing an exemplary embodiment of creating a control system with which described embodiments can be implemented.
Figure 3:
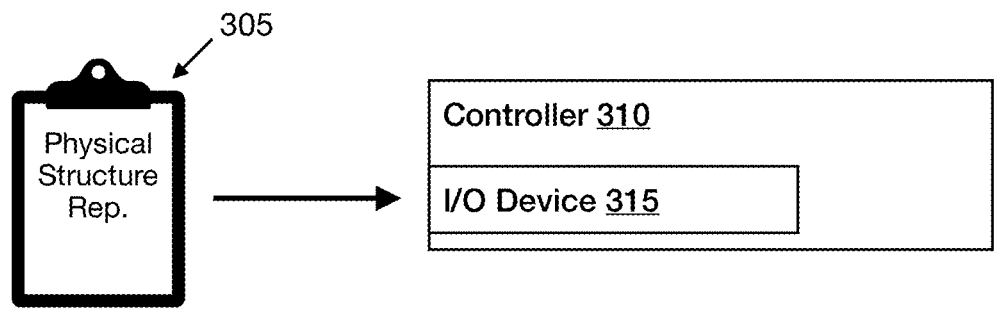
FIG. 3 is a diagram representing a relationship between a controller and a physical structure in conjunction which described embodiments can be implemented.

With reference to FIGS. 2 and 3, a method for creating a controller wiring board is disclosed. The controller wiring board comprises the controller and its wiring terminals knowing what devices are to be wired to it, and the wiring terminals of the correct type to be wired to the devices. The controller 310 is operationally able to accept representation of a physical structure 205, which may be a blueprint, and/or may be in the format in a computer-readable format 305 (e.g., GBXML, IFC, ResCheck, ComCheck, etc.), may be a room scan (or series of scans of spaces) created using scanning hardware and/or software; the representation of the physical structure may be input using the I/O device 315. The wiring terminal 175 may be directly attached to the controller 105, or may be part of a module that is itself attached to the controller, receives signals from the controller, and passes signals to the controller. One or more wiring terminals comprise a wiring panel, which may be comprised of modules. The wiring terminal itself is able to be wired to a device that will be controlled by the controller. Such devices comprise HVAC equipment, lighting equipment, irrigation equipment, sensors, security equipment, and so forth. Some devices require multiple wiring terminals.

Figure 7:
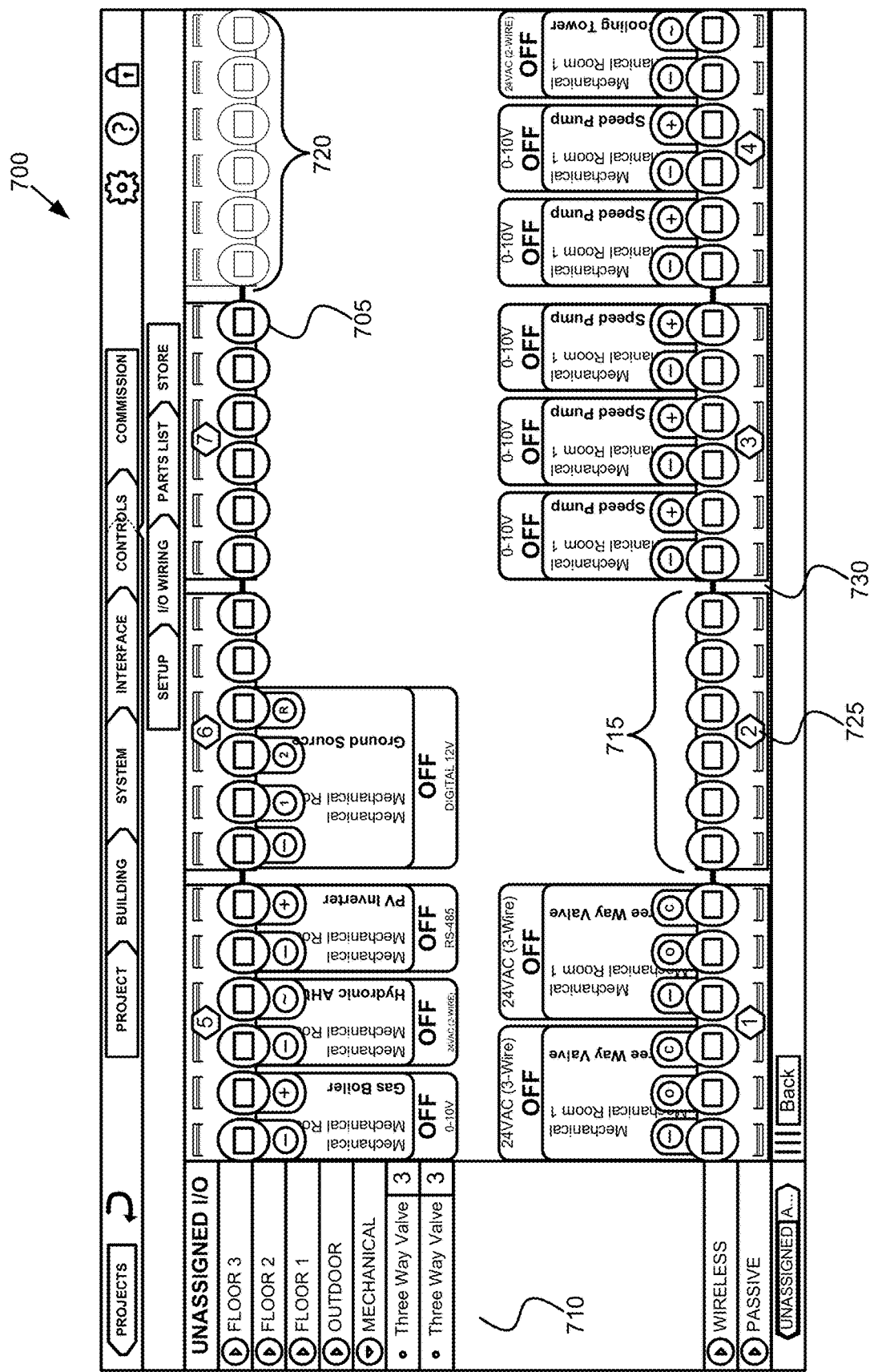
FIG. 7 is an exemplary screen shot in conjunction with which described embodiments can be implemented.

At 210, the controller 100 is operationally able to accept a predefined unit model from a list of predefined unit models displayed on the display apparatus 180. With reference to FIG. 7, a graphical representation of at least a portion of a control system is shown. At 700 an embodiment is disclosed that allows a user to chose a predefined unit model 710 from a list of predefined unit modules 710 using a WYSIWYG interface. Specifically, a user selects a type of unit model, such as a sensor, a user input, or an indicator, a heat source, a solar source, a pump, and so on. Once a unit model has been chosen, a user can use a cursor, a mouse, their finger, etc. to place the unit model within a representation of the physical structure.

In some embodiments, the following basic graphic concepts are used.

LEFT DRAWERS: Far left drawers 710 provide general categories of unit models. When a drawer is opened, specific unit models that can be chosen are exposed. The illustrative example shows Mechanical devices.

MAIN GRAPH PANELS: The graph panel 720 provides an overall drawing of a controller that is being worked on.

In an illustrative embodiment, once a user has placed the representation of the unit model within the representation of the physical structure, the controller is operationally able to accept the placement location of the predefined unit model type 215, at the location chosen. In some implementations, the physical model may be divided, with just a portion displayed at a time. Possible divisions are: Floor 1, Floor 2, Floor 3, Outdoor, etc. Once a division is chosen, further subdivisions may be chosen. Such subdivisions may comprise entry, dining. sitting, kitchen, living, exercise, air studio, bath. The specific divisions and subdivisions may depend on the physical structure and how it has been represented within the controller.

At 220, the controller is operationally able to create a control system for the physical structure, the predefined unit model, and the controller model, with the predefined unit model represented as being wired to the controller. A control system is a system whose output can be managed (controlled or regulated) by modifying its input. This information includes inputs and outputs. This information may also include the specific wiring information needed to wire the unit models.

Figure 4:
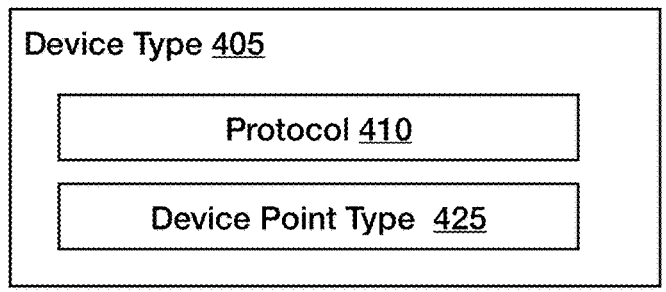
FIG. 4 is a block diagram describing embodiments of device types in conjunction with which described embodiments can be implemented.

With reference to FIG. 4, a system that can be used in embodiments disclosed herein is shown. A device type 405 comprises a protocol 410, and a device point type 425. "Protocol" may be understood as a broad term encompassing open protocols such as BACnet, closed protocols, such as SNA, protocols for individual pieces of equipment, such as whether they are analog, the voltage allowances, e.g., 0-10 volts, a single value such as 40 milliamps or 12 volts; the signals that a specific piece of equipment uses to communicate with a controller, such as on/off values, current, voltage, networkable protocol, modulation, frequency, any combination of the above, etc. A device point type is the specific type of the signals that will transfer down the wire that will be wired to the terminal, such as (+), (−), (~), (1w), (O), (C), (A), (B), and others, as known by those of skill in the art.

Figure 5:
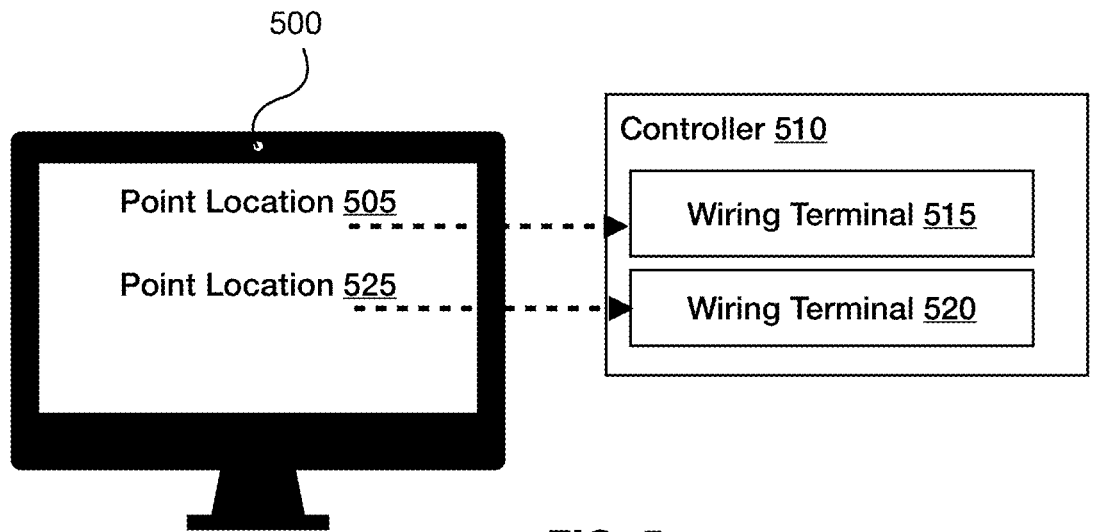
FIG. 5 is a diagram representing a relationship between point locations and wiring terminals in conjunction with which described embodiments can be implemented.
Figure 6:
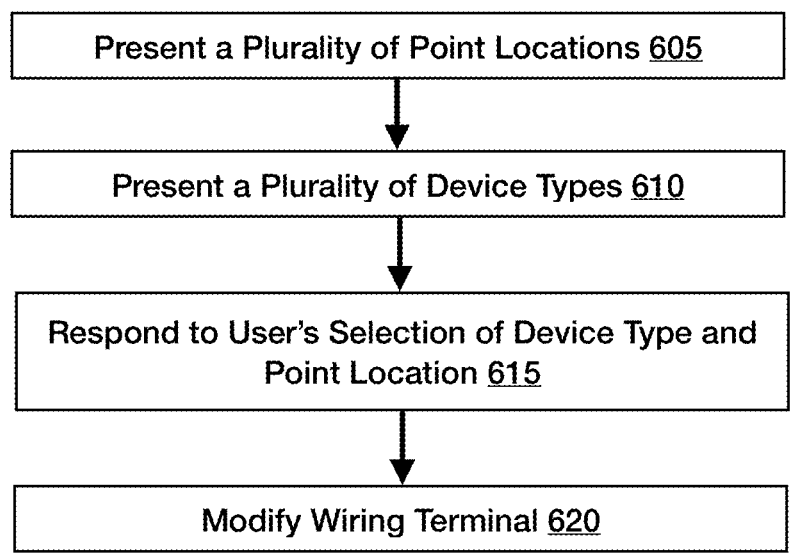
FIG. 6 is a flow chart showing an exemplary embodiment of screen actions in conjunction with which described embodiments can be implemented.

With reference to FIG. 5 and FIG. 6, a controller 510 has wiring terminals 515, 520, representations of which are shown as point locations 505, 525 on a display apparatus 500. At 605, a plurality of point locations are presented, the point locations representing wiring terminals. An example of point locations representing wiring terminals is shown at FIG. 5.

At 605, a plurality of point locations (e.g. 505, 525) are presented on a display (e.g. 500). At 610, a plurality of device types 405 are presented on the display; these device types associated with the controller 100, a plurality of device types representing devices able to be wired to the controller; the device type having a protocol and a device point type, as described with reference to FIG. 4. At 615, the controller responds to a user's selection of a device type and a point location. At 620, a wiring terminal (e.g., 215) represented by a point location (e.g., 505) is modified to match the device point type (e.g., 425). The wiring terminal may be modified using software stored in the memory 115, 125 of the controller 100 and run using the processor 105, 110.

With reference to FIG. 7, at an exemplary screenshot is shown illustrating methods and systems described herein. At 705, a point location is shown that represents a wiring terminal on a controller. At 710, a plurality of device types are presented on the display, the device type representing devices able to be wired to the controller, in this case, two Three Way Valves. In some implementations, a user specifies beforehand what devices are in a space that will be controlled by the controller. Those devices that are not yet assigned a controller location then show up on the interface to be moved into position. In some implementations, a library of possible devices is listed on the interface. In some implementations, a user is able to specify devices and their characteristics to be added to a controller. In some implementations, a wide range of devices are preloaded into the controller. A user can select a device type 710, and then move that device type to a wiring terminal (or terminals) e.g., 705. In response to a user's selection of a device type 710 and a point location 705, a controller can then modify the wiring terminal represented by the point location to match the device point type.

In some implementations, a module image 715 is displayed on the screen. The module image may be set apart by some method that delineates a specific module. In the illustrative embodiment, a module has a number indication 725 "2," for this module, but the modules may be sequentially numbered. There also may be a gap 730 between the modules. Other methods that separate modules are also envisioned. All modules may not be filled in a controller. Such unfilled locations may be marked 720, such as by not having a module number, being in a different color, having different line width, etc.

Figure 8:
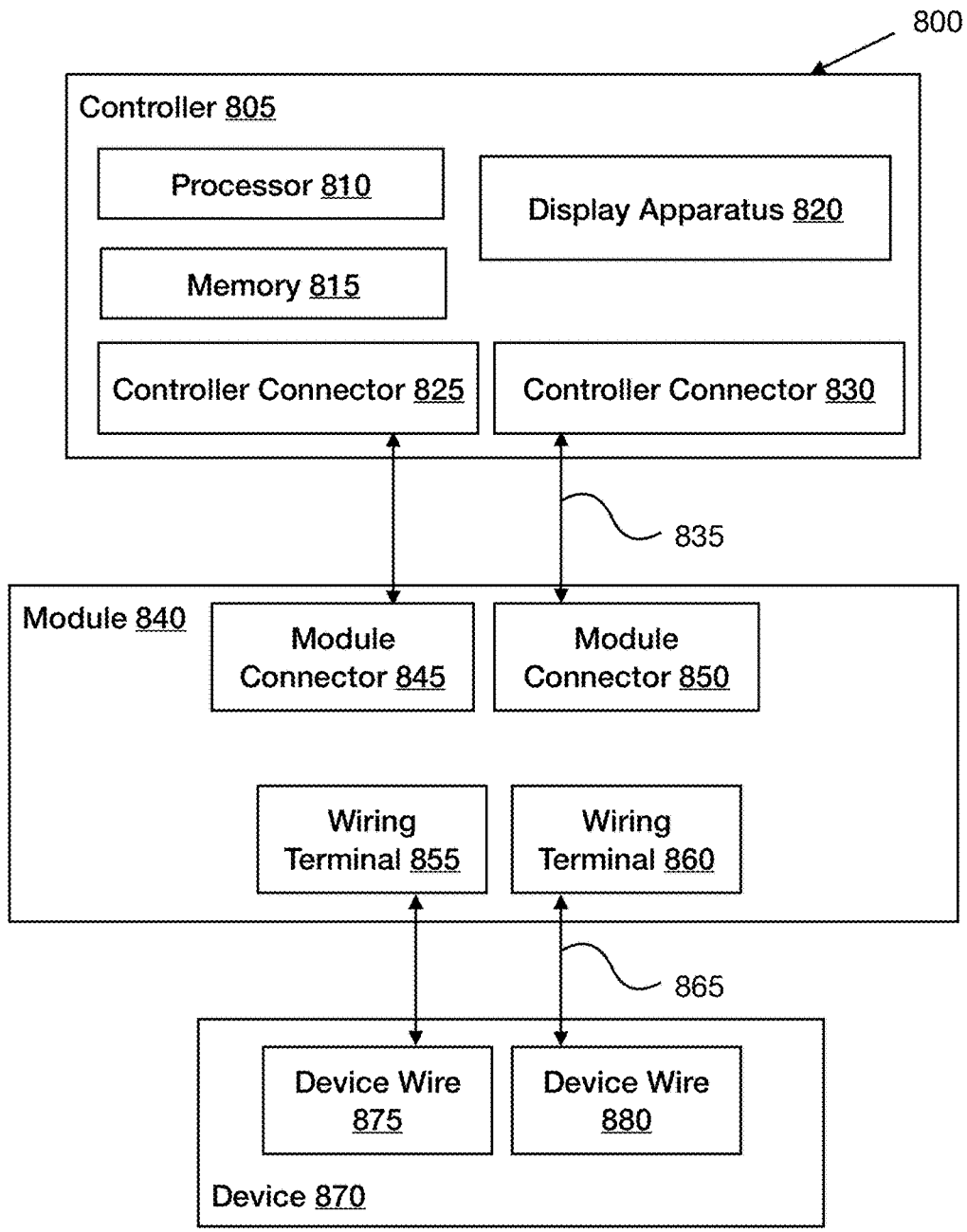
FIG. 8 is a block diagram showing an exemplary relationship between controllers, modules, and devices, in conjunction with which described embodiments can be implemented.

In some implementations, the controller comprises modules that plug into the controller. Devices are wired to the modules. The devices are connected to the controller through the module. This is explained in more detail with reference to FIG. 8. At 800, a partial system is shown that may be used in embodiments disclosed herein. A controller 805 comprises a processor 810, memory, 815, and a display apparatus 820. The controller may have one or more controller connectors 825, 830 that connect 835 to module connectors 845, 850 in the module 840. The module 840 may have wiring terminals 855, 860, that are directly wired 865 through device wires 875, 880 to a device 870. This device may be any sort of device, without limitation, that can be wired to a controller. The controller 805 controls the device 870 though the module connectors 845, 850 communicating to the controller connectors 825, 830, and vice-versa.

This allows the controller to control the equipment, such as turning a heater on, through the controller connector 825, 830 passing information through the module 840 to the module connectors 845, 850 on the module 840 to the device wire 875, 880, and from the device wire 875, 880, to the device 870. In certain embodiments, a controller may not control a specific resource at all, but infers its state from sensors, the state of other resources, and so forth.

Figure 9:
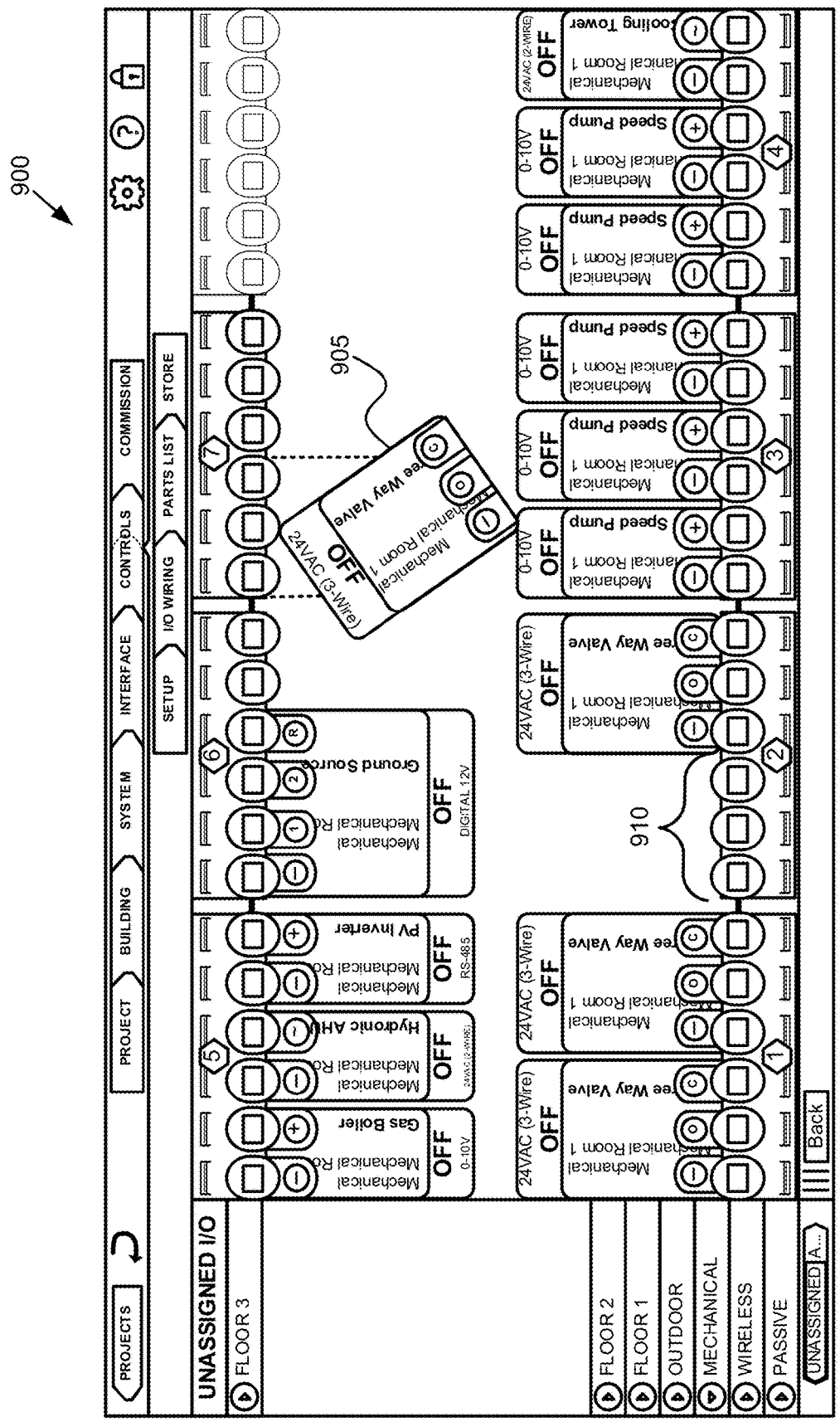
FIGS. 9-17 are exemplary screen shots in conjunction with which described embodiments can be implemented.
Figure 10:
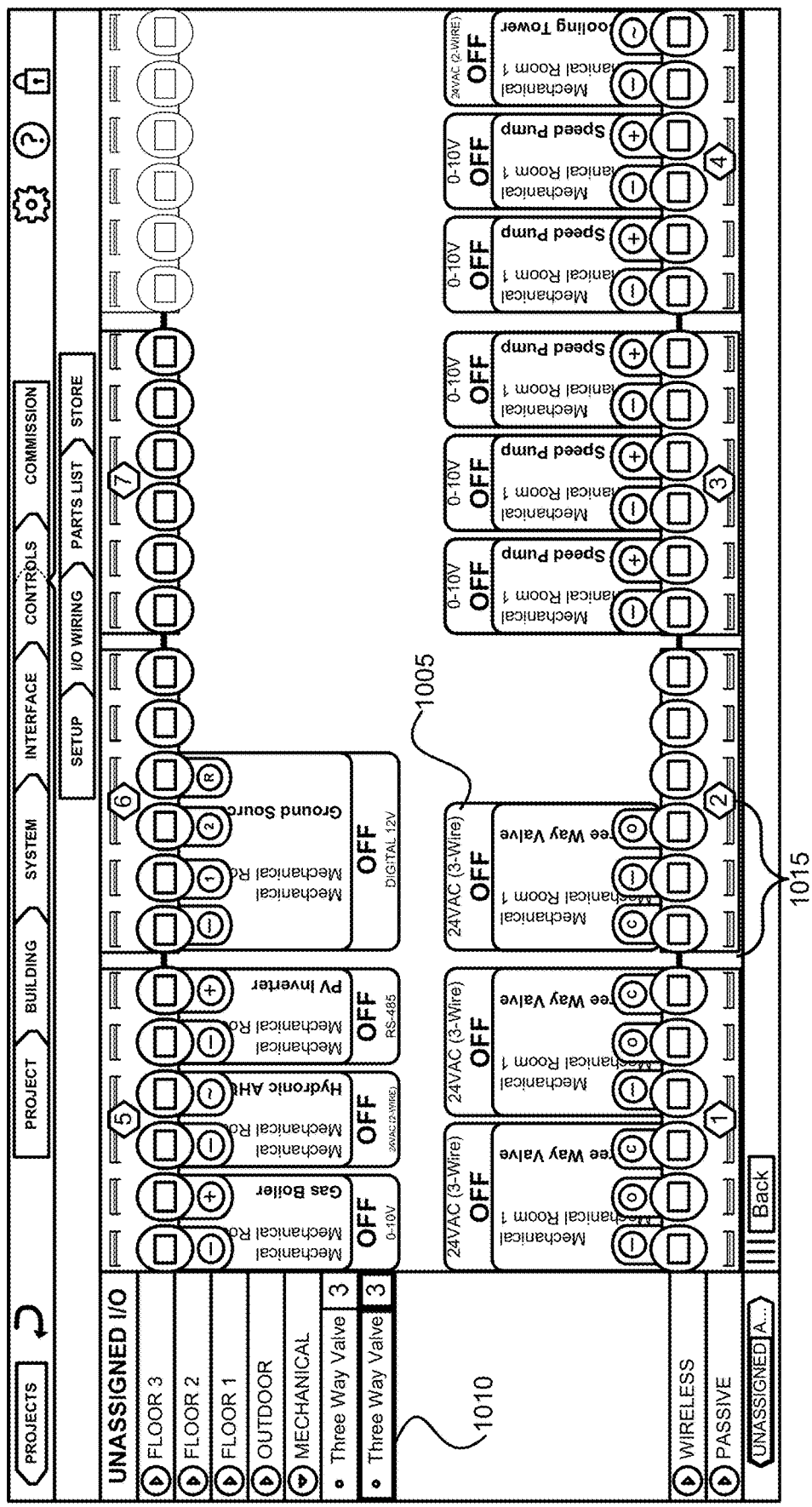

With reference to FIG. 9, at 900, a device type 905—a three way valve, in this instance—with three device terminal connection types (also called 'point types'), (−), (O), and (C) from left to right, can be seen being moved to three wiring terminal locations (point locations) 910. With reference to FIG. 10, the device 905, 1005 is moved into the point locations shown at 910, the device type covering those three locations 1015, when placed. The controller, knowing the terminal locations of the device type wires, and their device point type (in this case (−), (O), and (C) 1015) can modify the terminal locations represented by the point locations 910 to match those expected by the device (in this case, a three-way valve 905, 1005) that the device type represents.

Figure 11:
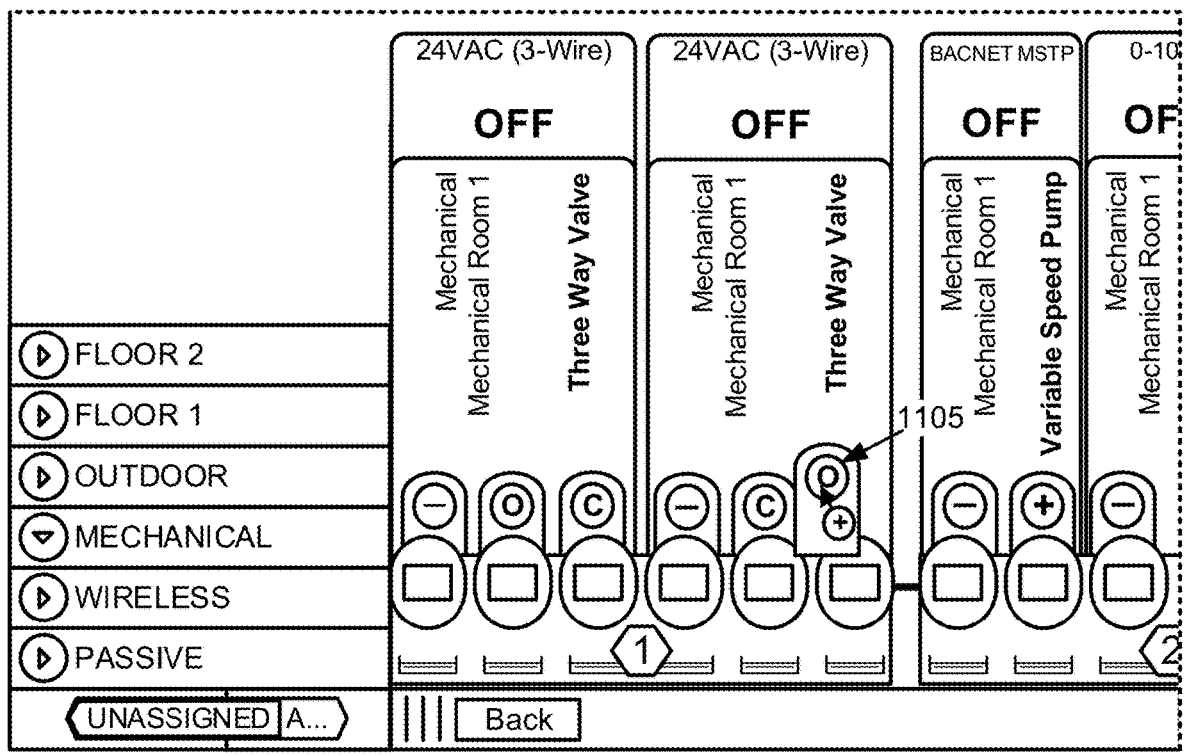

With reference to FIG. 11, a user can select a device point type 1105 on a display apparatus 820, which may bring up a list of possible device point types available at that controller connector location 825, 830. These device point types 1105 may be associated with a wiring terminal 855, 860 associated with a module 840, as explained elsewhere. A user can then select the desired device point type from the list. In this case, the device point type is being changed from a (O) to a (+) 1105.

Figure 12:
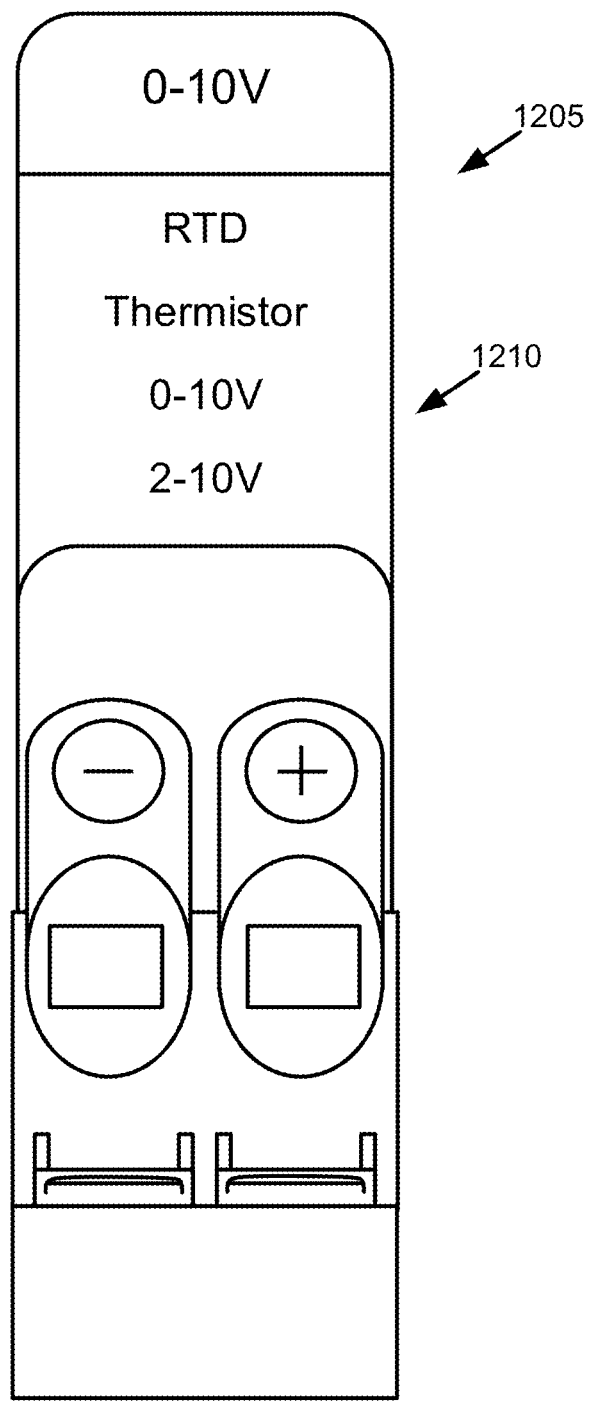

With reference to FIG. 12, and continuing reference to FIG. 11, a user can change device protocols. Common protocols can be accessed using the interface. In an exemplary implementation, a protocol can be changed by selecting the device protocol text location 1205. A number of common protocols—allowable protocols—for that device type are revealed 1210. A user can then select the desired protocol. The controller 805 will then expect to be connected to a device with the protocol selected. In some instances, this triggers the wiring terminal 855 associated with the chosen slot on the controller to modify itself to match the protocol selected by the user. This change may be triggered by a point type modification request from the controller.

In some embodiments, this allows the controller, among other things, to determine if the correct device wire has been connected to the correct controller connector 825, 830, or the correct module 840 wiring terminal 855, 860.

Figure 13:
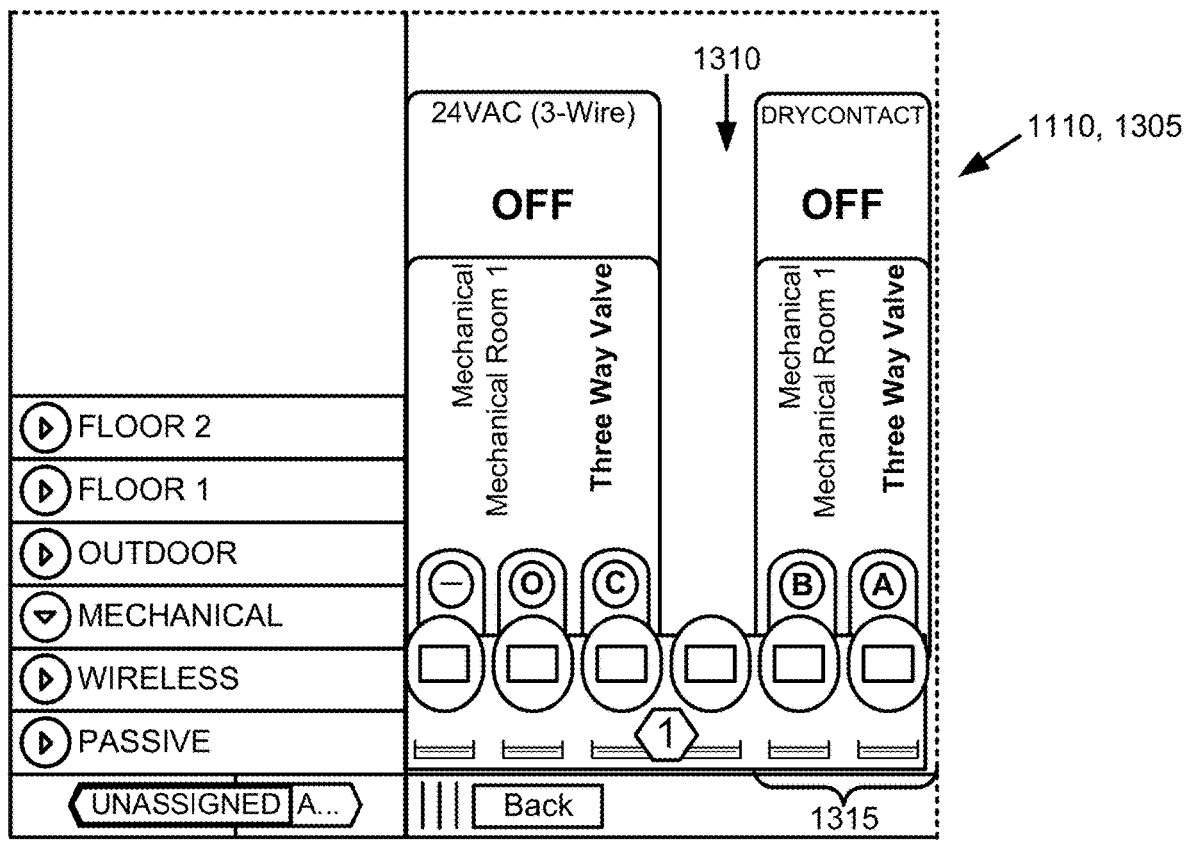
Figure 14:
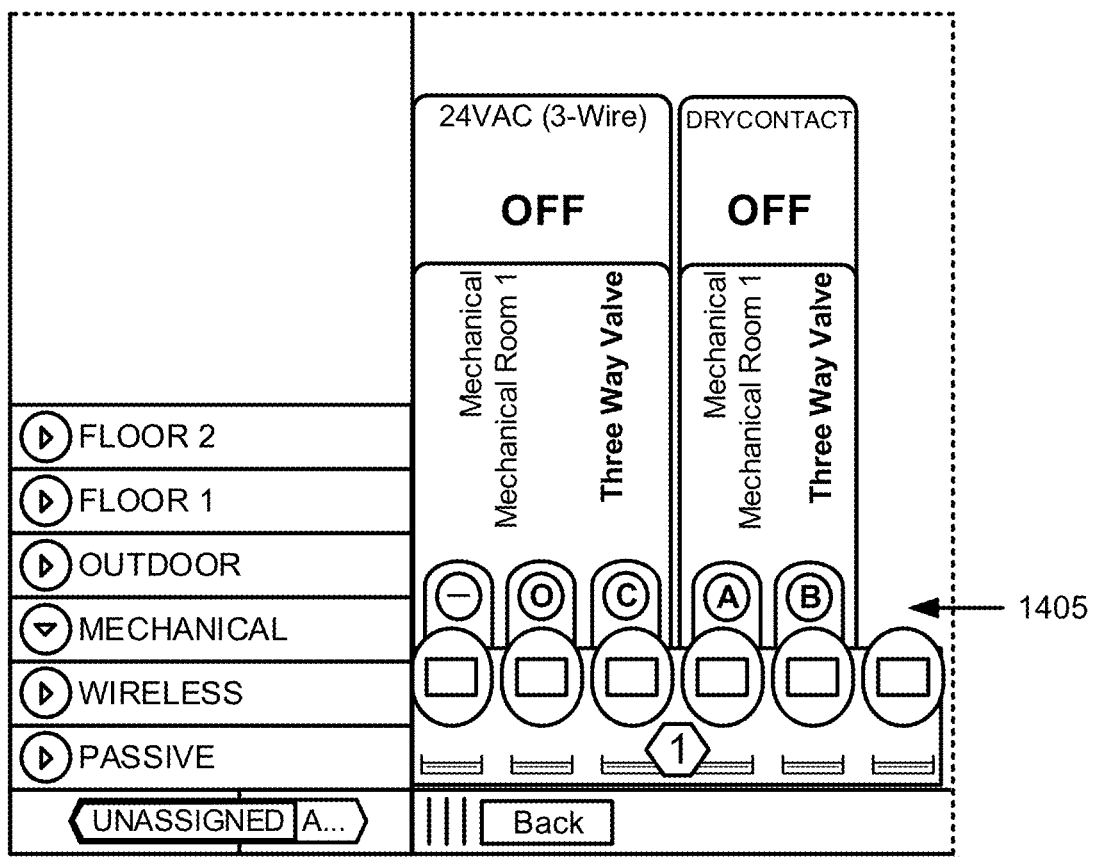

If the user chooses a new device type that has a different number of device point type wiring locations than the original device type, the display will reflect the new device type, including the number of device point wiring locations that are displayed. The device picture and the wiring terminal point types shown on the display will modify what the controller wiring terminals associated with the display expect. At 1110, a three-way valve is shown with protocol 24 VAC (3 wire) with three point type locations representing three wiring terminals of types (−), (C), and (O). A user may change the three-way valve protocol to DryContact 1305 by selecting protocol options and then clicking on "drycontact". This can be seen at 1310, where the three-way valve shown at 1110 with three terminal connections has now turned into a DryContact three-way valve with two terminal connections 1315. FIG. 14 illustrates the Three Way Valve of FIG. 13 moved one wiring terminal connection to the left. This leaves the right wiring terminal location 1405 empty.

Figure 15:
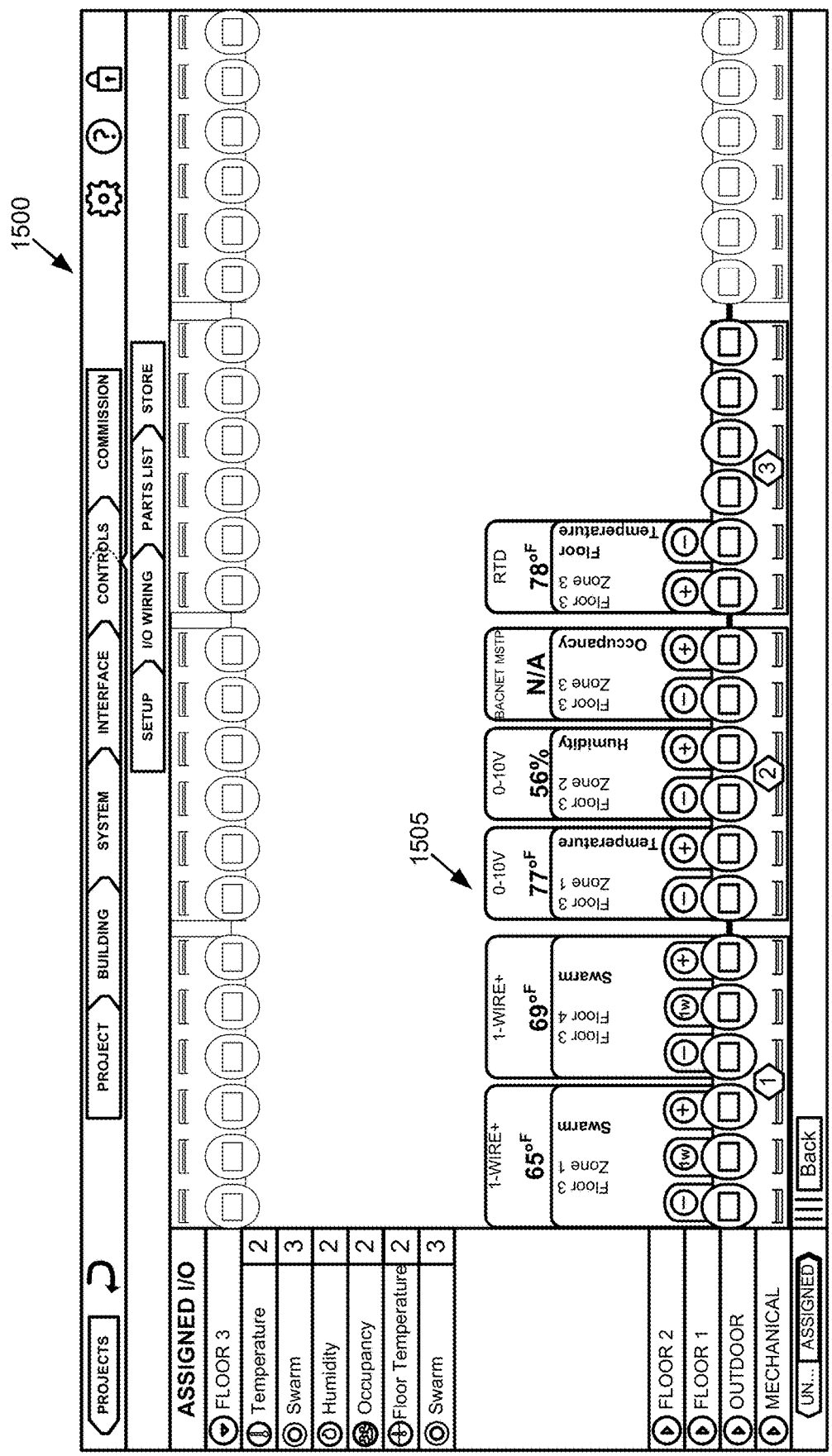
Figure 16:
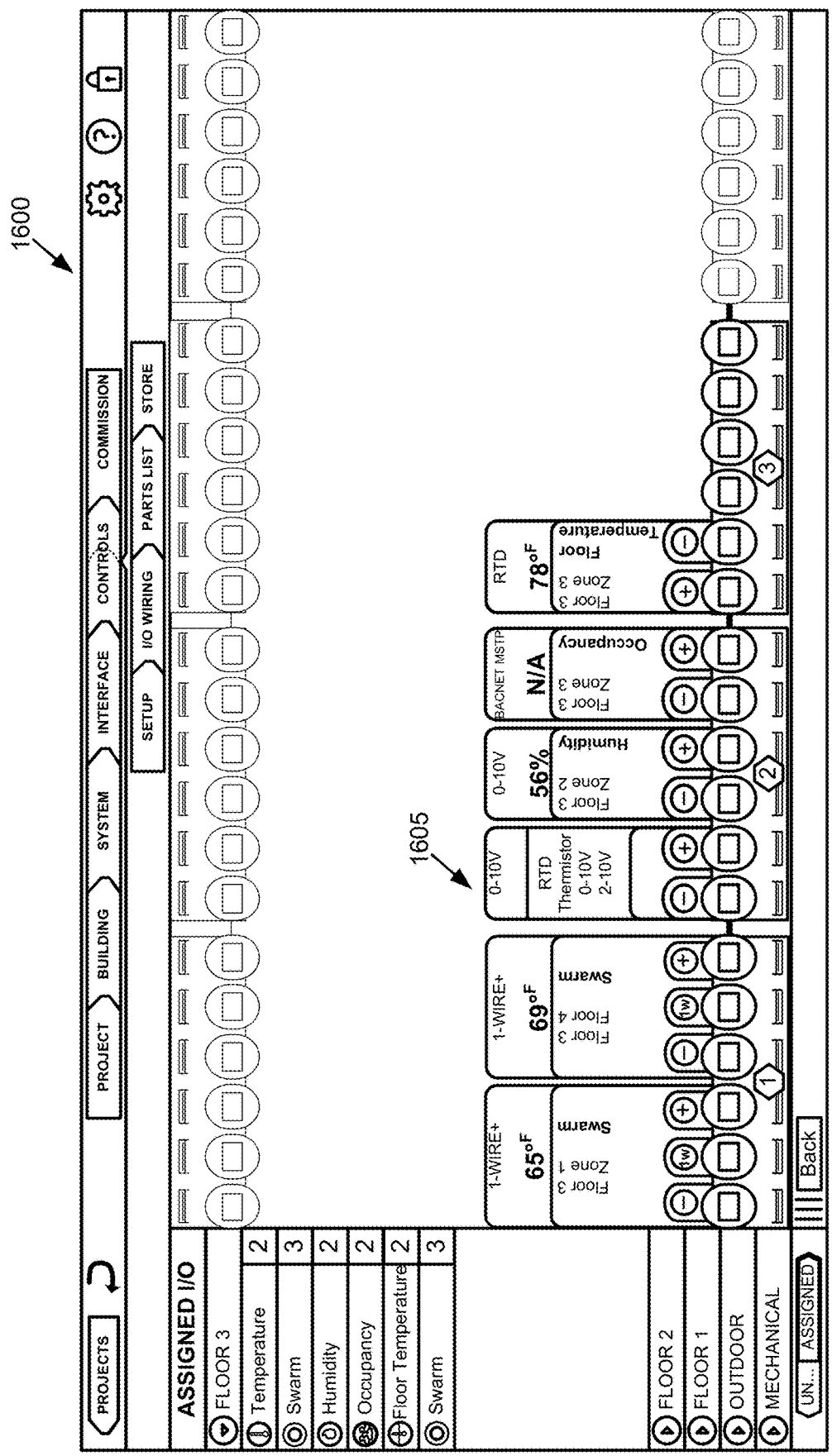
Figure 17:
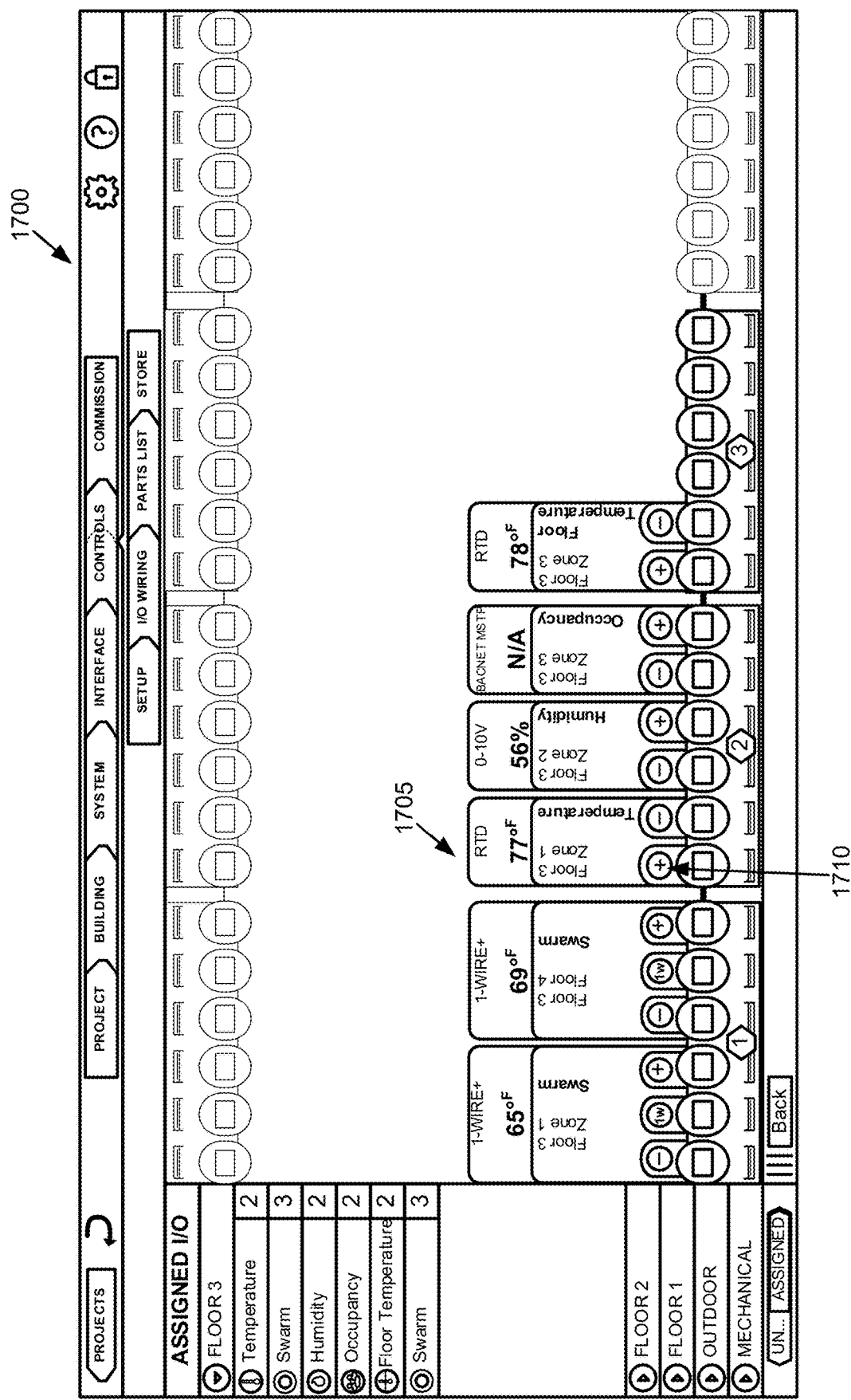

With reference to FIGS. 15, 16, and 17, screenshots 1500, 1600, and 1700 are disclosed that show an embodiment allowing a device to be selected that has been already placed within the controller representation, and then changed to a different template. In this example, the device selected is a temperature sensor with a 0-10V protocol 1505. A user selecting the device can display a menu of templates 1605 that can be used with the device 1505, here "RTD", "Thermistor", "0-10V", and "2-10V". The current device has the device point types (−) and (+) 1610. As shown at 1700, the user selected the template RTD 1705, which changes the device type template (and thus, the protocol) 410 to RTD 7105 and changes the device point types 425 from (−), (+) 1010 to (+), (−) 1710.

Figure 18:
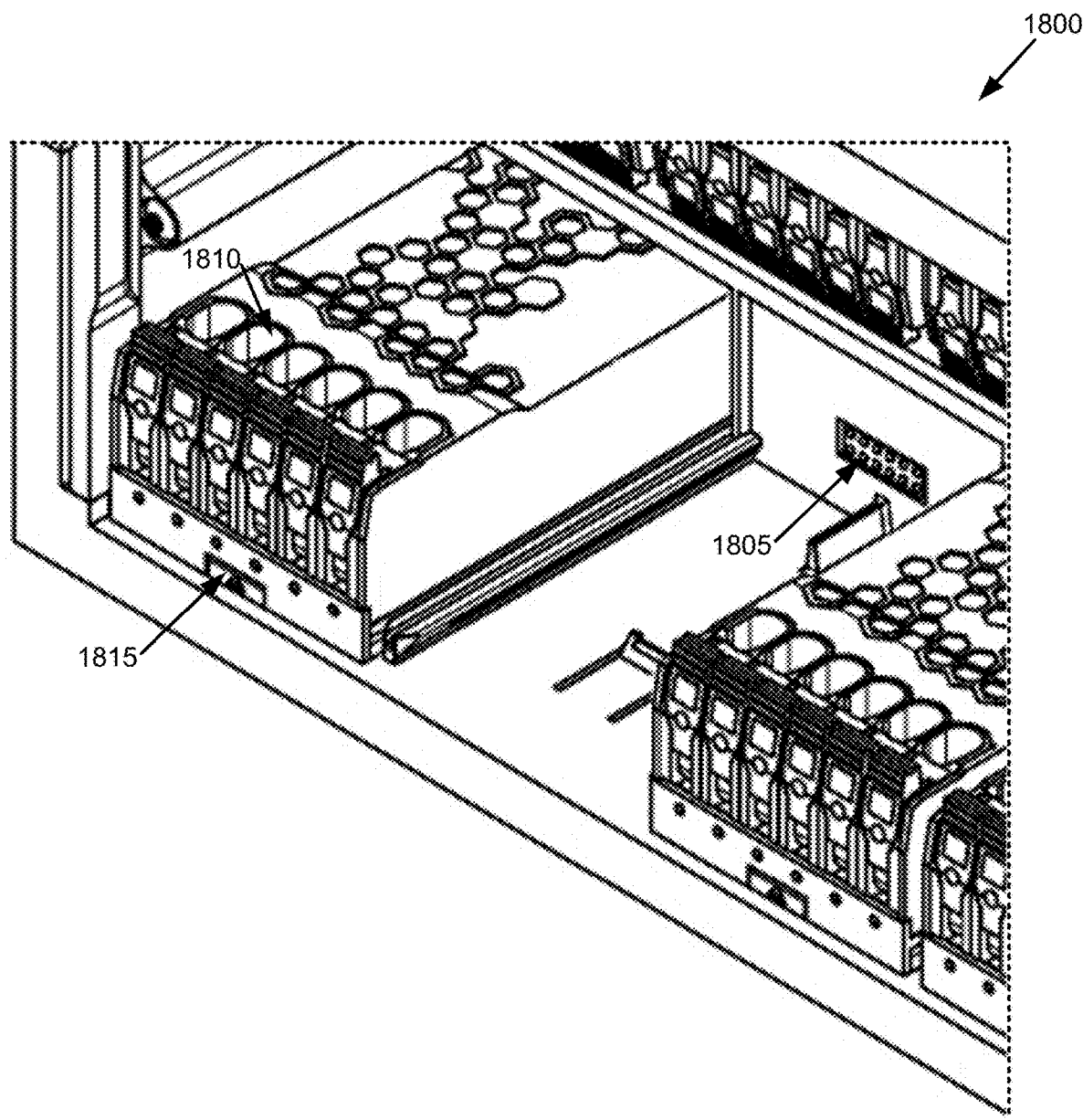
FIG. 18 is a drawing of a portion of a controller showing a module in conjunction with which described embodiments can be implemented.
Figure 19:
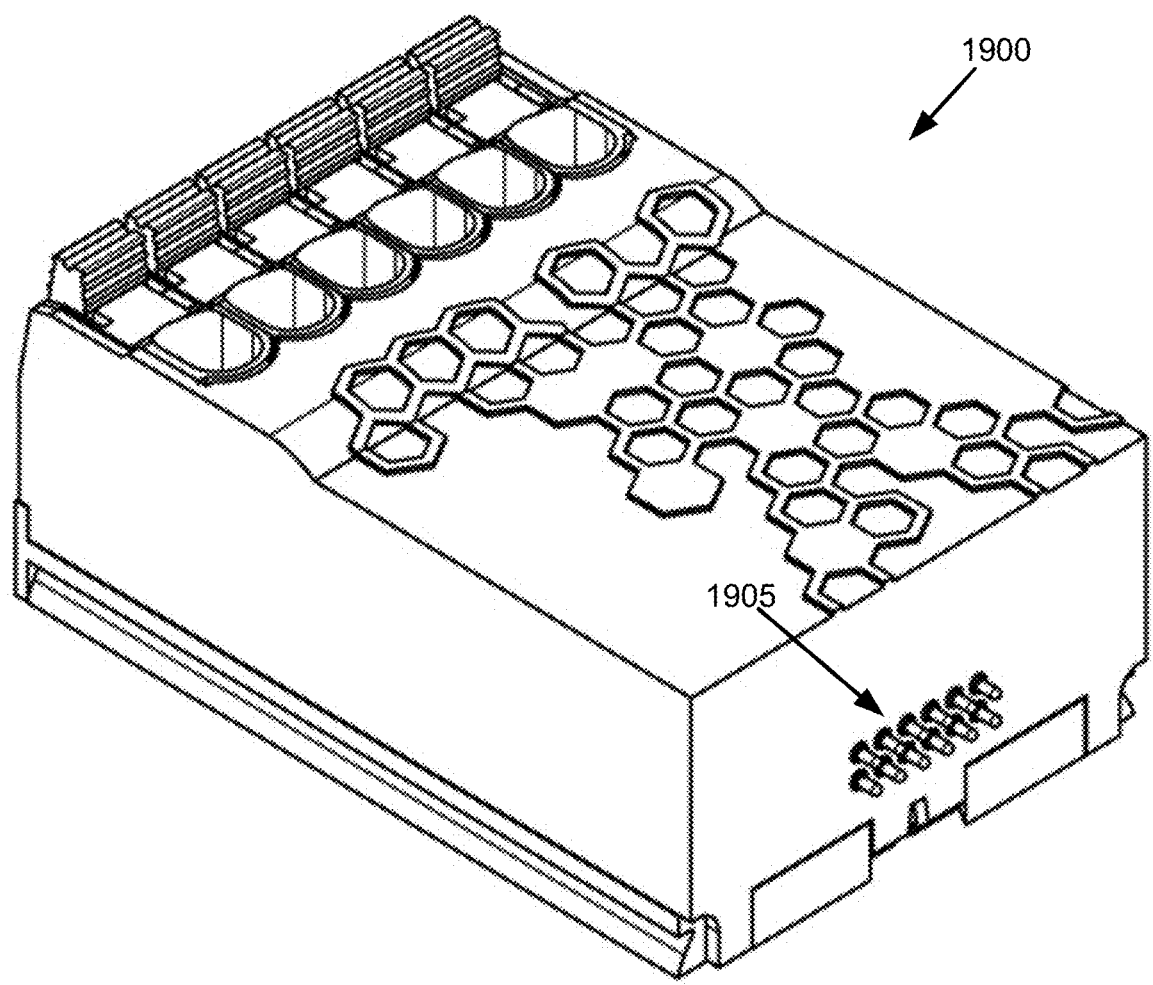
FIG. 19 is a drawing of a module in conjunction with which described embodiments can be implemented.

With reference to FIGS. 18 and 19, a controller 1800 is disclosed with a module 1815 that has wiring terminal pins 1210 which can connect a device wire to the controller 1800. A device wire is placed in the terminal contact wiring pin 1210. A module 1900 has a set of terminals 1905 that connect the device wire to terminals 1805 on the controller. The modules, in some embodiments, further comprise a module circuit board with memory and software, which can accept a signal from the controller, the signal comprising a designation of a wiring pin 1810 to be modified on the module and a point type modification request (e.g., what type of point type should the pin be?). With this information, the module circuit board has hardware and software that can change the designated wiring pin to the type of modification that has been requested.

Figure 20:
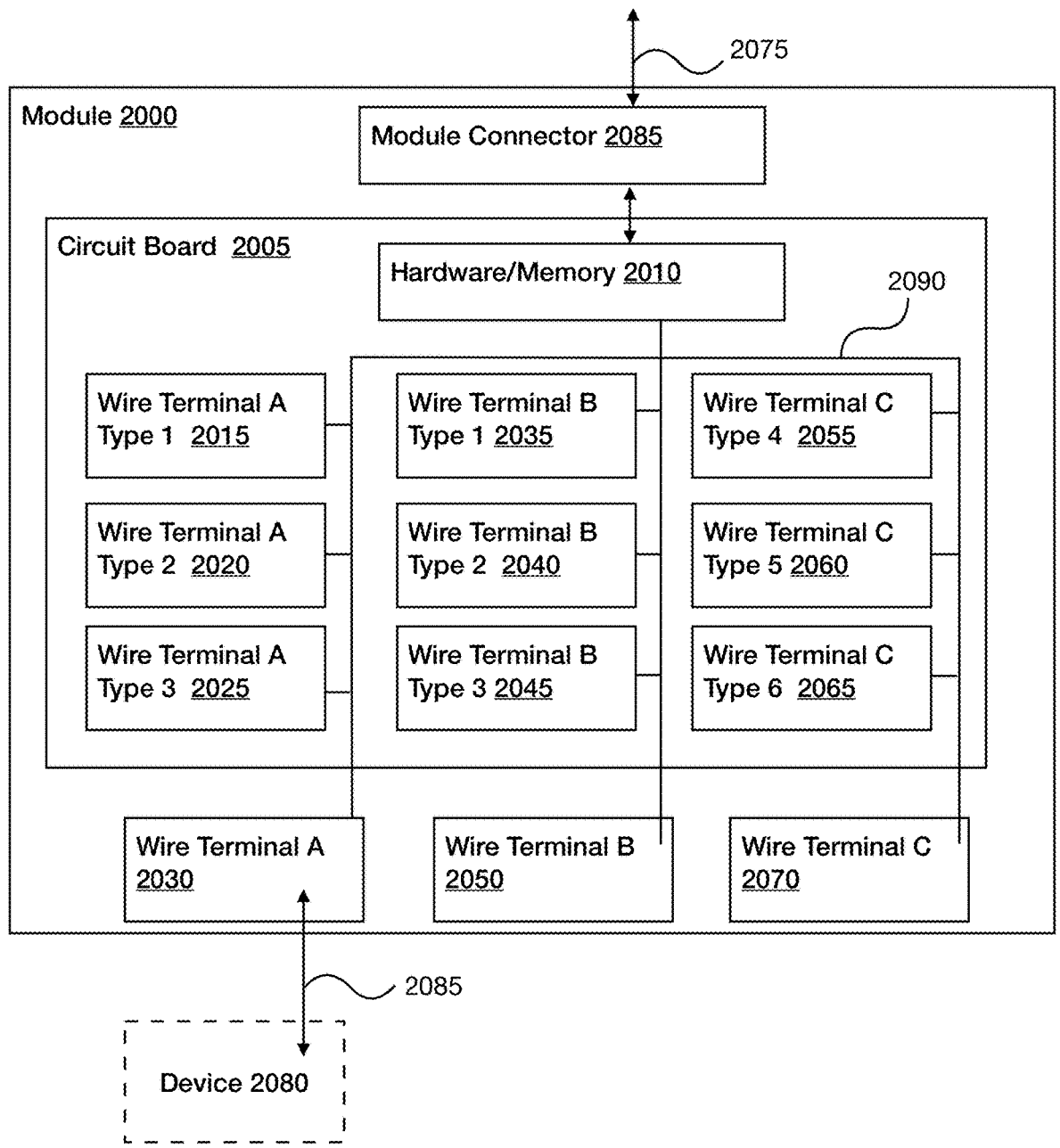
FIG. 20 is a diagram of a module circuit board with which described embodiments can be implemented.

FIG. 20 shows some of the aspects of a module 2000, with emphasis on the circuit board 2005 and the wiring terminals 2030, 2050, 2070. In some embodiments, the module itself 2000 can make decisions and do processing using hardware and memory 2010 on its circuit board 2005. The memory may comprise software. A controller 1800, though a controller terminal 1805 may send messages to a module terminal/module connector 1905. The module terminal may then send those messages to its circuit board 2005, which may then process the messages and make decisions. This may result in an altered signal from the signal originally sent by the controller. This altered signal may then be passed to a wire terminal 2030, 2050, 2070, which sends it to a device 2080 This process may work the opposite way as well. A device 2080 sends a message through a wire terminal 2030 to the circuit board 2005, which may then process the message, changing the signal. The changed signal is then sent through the module terminal/module connector 2085 to the controller.

In some embodiments, the controller may send a signal through the module terminal to the wire terminal without making any changes. This may be a point type modification request. Similarly, in some implementations, a device may send a signal to the controller through the module 2000 without the module making any changes.

In some embodiments, modules 2000 can do processing and make decisions using the hardware and memory 2010 on their circuit board 2005. For example, a controller can send a signal 2075 to a module telling it to turn a light off on a device. The module may be able to determine which of its wire terminals 2030, 2050, 2070 are associated with the device, and then send the signal 2085 to the device 2080. In some embodiments the module may be sent information and which specific wire terminal 2030, 2050, 2070 the specific information is to be sent to. The same module may be able to handle both situations.

In an embodiment, a module has three wire terminals, wire terminal A 2030, wire terminal B 2050, and wire terminal C 2070. These wire terminals may be of different functions, eg., type 1, type 2, type 3, type 4, type 5, or type 6. Some terminals may have two or more suctions. The circuit board 2005 has hardware associated with the wire terminals that can be enabled, allowing the wire terminals to be of any of those three types. Wire terminal A 2030 has, associated with it in the circuit board, hardware for three types: wire terminal A Type 1 2015, wire terminal A Type 2 2020, and wire terminal A type 3 2025. Wire terminals B, similarly has the hardware potential to be one (or more) of the three types as well—Wire terminal B Type 1 2035, wire terminal B Type 2 2040, and wire terminal B type 3 2045. Wire terminal C has different types associated with it: Wire terminals C Type 4 2055, wire terminals C Type 5 2060, and wire terminal C type 6 2065. The controller can tell the module 2000 through its link with 2075 with module connector 2085 that wire terminal A is supposed to be type 1. The module 2000 may then be able to use its hardware/memory 2010 on its circuit board to send a signal 2090 telling a wire terminal A to be of Type 3. The module 2000 may be able to connect wire terminals A type 3 2025 to wire terminal A, making wire terminal A of type 3. In some embodiments a single wire terminal may be multiple wire terminal types; for example, wire terminal A could be both type 2 2020 and type 3 2025.

In an embodiment, images presented on the display are shown to a user in WYSIWYG (what you see is what you get) form. WYSIWYG denotes that the representation on the screen represents, in visual format, the actual controller wiring system.

In an embodiment, the module is 2.84"×1.91"×1.11" inches. In another embodiment, the module is smaller than 3"×2"×1.25".

In some implementations, the following modules and module options exist:
  Multi Cell Module
  A Multi Cell module may comprise the following options:
  A Ground connection (through a FET)
  a 24 VAC power connection (through a Triac)
  A 0-10V DC analog voltage (via a DAC)
  A Strong 1-wire pullup (via a FET)
  A High-range voltage divider: It is not known what will be plugged in, so the terminal must anticipate the highest tolerated value (480 volt) if someone plugs in an unknown signal with unknown voltage measure. First, the system checks with high range ability, if it sees a tiny signal, it can switch to low range, then measure the small signal. This way, the module can be safe the whole time.
  A Low range voltage divider
  A 4-20 mA current shunt
  A 24 VAC current shunt
  A DC offset injector that can measure both halves of an DC waveform
  Real-time current monitoring and real-time voltage monitoring.

Power Cell Module (Also Known as a Lighting Module)
  A power cell module may have some combination of 2× power control blocks, 120/240 VAX output—2 amps, 24 VAC output—2 amps, AC motor control,
  The power module may also comprise dimmable lighting, real-bane current monitoring and real-time voltage monitoring.
Motor Cell Module
  A motor cell module ma e some combination of 2×DC motor control blocks,
  Up to 6 12/24 VDC high current motor drivers, can switch 2050 volt AC up to 10 amps
  A way to measure voltage
  A chip that measure current—the current that gets consumed passes through, both module connections, detect how much voltage being used and current being used, led's too.
  These modules may also comprise PWM speed control, real-time current monitoring, real-time voltage monitoring, overcurrent/torque protection, and tachometer feedback.
Relay Cell Module
  2 electromechanical relays
  The relays have 3 connections (normally open, common, normally closed)
  The relay module may be able to measure voltage and current for the common connector on the relays.
  Relay modules may also provide for real-time current monitoring, real-time voltage monitoring, and overcurrent protection.

Different modules may have different features. The options shown here are illustrative embodiments.

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

We claim:

1. A method of creating a wiring panel for a controller, the controller with a processor, memory, display, and wiring terminals, the method comprising:
  presenting, on the display, at least two module images, the at least two module images representing separate locations on the controller;
  presenting, within the at least two module images, a plurality of point locations, each point location representing a wiring terminal associated with the controller;
  presenting, on the display, a plurality of device types each representing a device able to be wired to the controller; each device type having a protocol and a device point type; and
  in response to a user's selection of a device type of the plurality of device types and a point location of the plurality of point locations, moving the device type presented on the display to a single wiring terminal represented by the point location, and modifying the single wiring terminal represented by the point location to match the device point type.

2. The method of claim 1, wherein at least one device type comprises device point types, and further comprising, in response to a user's selection of the device type, presenting, on the display, a representation of the device point types.

3. The method of claim 1, further comprising in response to a user's selection of one of the plurality of device types giving a selected device type, presenting, on the display, a plurality of device wiring protocols for the selected device type.

4. The method of claim 3, further comprising, in response to a user's selection of a device wiring protocol, modifying the wiring terminal represented by the point location to match the device wiring protocol.

5. The method of claim 4, wherein modifying the wiring terminal represented by the point location to match the device wiring protocol comprises using software stored in the memory to modify the wiring terminal associated with the point location.

6. The method of claim 5, further comprising a module and wherein one of the at least two model images is associated with the module, and wherein the wiring terminal associated with the point location is associated with the module.

7. The method of claim 6, wherein the module comprises associated module hardware and associated module software, and wherein the associated module hardware or the associated module software modifies the wiring terminal.

8. The method of claim 7, wherein the controller sends a signal to the module, and wherein the module sends the signal to the wiring terminal.

9. The method of claim 8, wherein the module is operationally able to be connected to the controller through a module connector.

10. The method of claim 9, wherein the protocol comprises an open protocol or a closed protocol.

11. The method of claim 1, further comprising in response to the user's selection of a representation of a device point type, presenting, on the display, a plurality of point type selections.

12. The method of claim 11, wherein images presented on the display are incorporated therein to a user in WYSIWYG form.

13. The method of claim 12, wherein the controller is operationally able to be wired to a device represented by the device type.

14. A computer-readable storage medium configured with executable instructions to perform a method for creating a wiring panel for a controller, the method comprising:
   presenting, on a display associated with the controller, at least two module images, the at least two module images representing separate locations on the controller;
   presenting, within the at least two module images, a plurality of point locations, each point location representing a wiring terminal associated with the controller;
   presenting, on the display associated with the controller, a plurality of device types each representing a device able to be wired to the controller; each device type having a protocol and a device point type; and
   in response to a user's selection of a device type of the plurality of device types and a point location of the plurality of point locations, moving the device type presented on the display to a single wiring terminal represented by the point location, and modifying the single wiring terminal represented by the point location to match the device point type.

15. The computer-readable storage medium of claim 14, wherein the controller further comprises modules, each module associated with a set of wiring terminals, one of the set of wiring terminals operationally able to connect a device wire to the controller through the associated module wiring terminal.

16. The computer-readable storage medium of claim 15, wherein the modules further comprise a module circuit board, the module circuit board operationally able to accept a signal from the controller, the signal comprising a designation of a wiring terminal to be modified and a point type modification request.

17. The computer-readable storage medium of claim 16, wherein at least one module of the modules modifies the module circuit board to match the point type modification request for the wiring terminal.

18. A system for controller wiring board creation, the system comprising:
   a processor;
   a memory in operable communication with the processor;
   a controller;
   a display associated with the controller;
   controller-device software residing in the memory and executable with the processor to perform a method which:
      presents, on the display associated with the controller, at least two module images, the at least two module images representing separate locations on the controller;
      presents, within the at least two module images, a plurality of point locations, each point location representing a wiring terminal associated with the controller;
      presents, on the display associated with the controller, a plurality of device types each representing a device able to be wired to the controller; each device type having a protocol and a device point type; and
      in response to a user's selection of a device type of the plurality of device types and a point location of the plurality of point locations, moving the device type presented on the display to a single wiring terminal represented by the point location, and modifies the single wiring terminal represented by the point location to match the device point type.

19. The system of claim 18, further comprising allowable protocols, and wherein in response to a user's selection of a device protocol, the display revealing the allowable protocols.

20. The system of claim 18, further comprising a module operationally able to be attached to the controller, the module associated with one of the at least two module images, wherein the controller modifies the single wiring terminal represented by the single point location to match the device point type further comprises the controller sending a message to the module, the module then modifying the single wiring terminal represented by the point location to match the device point type.

* * * * *